(12) United States Patent
Fan et al.

(10) Patent No.: US 12,014,498 B2
(45) Date of Patent: Jun. 18, 2024

(54) IMAGE ENHANCEMENT PROCESSING METHOD, DEVICE, EQUIPMENT, AND MEDIUM BASED ON ARTIFICIAL INTELLIGENCE

(71) Applicant: PING AN TECHNOLOGY (SHENZHEN) CO., LTD., Guangdong (CN)

(72) Inventors: Dongyi Fan, Guangdong (CN); Rui Wang, Guangdong (CN); Lilong Wang, Guangdong (CN)

(73) Assignee: PING AN TECHNOLOGY (SHENZHEN) CO., LTD., Shenzhen (CN)

( * ) Notice: Subject to any disclaimer, the term of this patent is extended or adjusted under 35 U.S.C. 154(b) by 379 days.

(21) Appl. No.: 17/613,482

(22) PCT Filed: Aug. 30, 2020

(86) PCT No.: PCT/CN2020/112331
§ 371 (c)(1),
(2) Date: Nov. 22, 2021

(87) PCT Pub. No.: WO2021/189770
PCT Pub. Date: Sep. 30, 2021

(65) Prior Publication Data
US 2022/0245803 A1 Aug. 4, 2022

(30) Foreign Application Priority Data
Jul. 31, 2020 (CN) .......................... 202010763141.4

(51) Int. Cl.
*G06T 7/00* (2017.01)
*G06T 5/40* (2006.01)
*G06T 7/13* (2017.01)

(52) U.S. Cl.
CPC .............. *G06T 7/0012* (2013.01); *G06T 5/40* (2013.01); *G06T 7/13* (2017.01); *G06T 2207/20084* (2013.01)

(58) Field of Classification Search
CPC ........... G06T 7/0012; G06T 7/13; G06T 7/00; G06T 5/40; G06T 2207/20084
See application file for complete search history.

(56) References Cited

U.S. PATENT DOCUMENTS 11,055,822 B2 * 7/2021 Ramanujam ............ G06F 16/53

FOREIGN PATENT DOCUMENTS

CN 107967442 * 4/2018 ............... G06K 9/00

* cited by examiner

*Primary Examiner* — Tuan H Nguyen

(57) ABSTRACT

An image enhancement processing method includes: acquiring an initial image, preprocessing the initial image, and acquiring an original feature image containing a target feature; performing an edge detection on the original feature image using an edge detection algorithm to obtain an original gradient image, obtaining a statistics ring based on the original feature image, and performing an iterative process on the statistics ring; obtaining a to-be-processed image based on an inner diameter of on the statistics ring, and determining to-be-processed parameters of the to-be-processed image: acquiring a standard image corresponding to the target feature, determining a standard area corresponding to the standard image, and acquiring standard image parameters corresponding to the standard area; performing a migration process on the to-be-processed image to obtain a migration image; and performing a restricted contrast adaptive histogram equalization process on the migration image to obtain a target enhanced image.

19 Claims, 7 Drawing Sheets

Client

Server

IMAGE ENHANCEMENT PROCESSING METHOD, DEVICE, EQUIPMENT, AND MEDIUM BASED ON ARTIFICIAL INTELLIGENCE

CROSS REFERENCE OF RELATED APPLICATIONS

The present application claims the benefit of Chinese Application No. 202010763141.4, entitled "image enhancement processing method, device, equipment, and medium based on artificial intelligence" filed on Jul. 31, 2020, the entire content of which is incorporated herein in its entirety.

TECHNICAL FIELD

The present disclosure relates to image processing technologies, and more particularly, to an image enhancement processing method, device, equipment, and medium based on artificial intelligence.

BACKGROUND

With the continuous development of image recognition technology, the image recognition technology is applied in more and more fields for improving work efficiency. Particularly, the image recognition technology is applied in the medical field for automatically recognizing images, such that the lesion can be quickly identified through the recognition results.

The inventor realizes that due to different shooting qualities of equipments, different collection environments, and different operating proficiencies of shooting physicians, non-target features may exist on the captured images and the distributions of the image pixel values are greatly differed, which results in relatively more interferences in the subsequent automatic recognition of the images and thus causes errors in the recognition results.

SUMMARY OF THE DISCLOSURE

An image enhancement processing method based on artificial intelligence, including:
  acquiring an initial image, preprocessing the initial image, and acquiring an original feature image containing a target feature;
  performing an edge detection on the original feature image using an edge detection algorithm to obtain an original gradient image, obtaining a statistics ring based on the original feature image, and performing an iterative process on the statistics ring; when the statistics ring intersects with the original gradient image, cropping the original feature image to obtain a to-be-processed image based on an inner diameter of on the statistics ring, and determining to-be-processed parameters of the to-be-processed image:
  acquiring a standard image corresponding to the target feature, determining a standard area corresponding to the standard image, and acquiring standard image parameters corresponding to the standard area; performing a migration process on the to-be-processed image according to the to-be-processed parameters and the standard image parameters to obtain a migration image; and
  performing a restricted contrast adaptive histogram equalization process on the migration image to obtain a target enhanced image.

An image enhancement processing device based on artificial intelligence, including:
  an original feature image acquisition module, configured to acquire an initial image, preprocess the initial image, and acquire an original feature image containing a target feature;
  a to-be-processed image acquisition module configured to perform an edge detection on the original feature image by using an edge detection algorithm to obtain an original gradient image, obtain a statistics ring based on the original feature image, and perform an iterative process on the statistics ring; crop the original feature image to obtain a to-be-processed image based on an inner diameter when the original gradient image intersects with the statistics ring, and determine to-be-processed parameters of the to-be-processed image;
  a standard image parameter acquisition module configured to acquire a standard image corresponding to the target feature, determine a standard area corresponding to the standard image, and obtain a standard image parameter corresponding to the standard area;
  a migration image acquisition module configured to perform a migration process on the to-be-processed image according to the to-be-processed parameters and the standard image parameters to acquire the migration image; and
  a target enhanced image acquisition module configured to perform a restricted contrast adaptive histogram equalization process on the migration image to acquire a target enhanced image.

A computer equipment including a memory, a processor, and a computer program stored in the memory and running on the processor, wherein, when being executed by the processor, the computer program implements following steps:
  acquiring an initial image, preprocessing the initial image, and acquiring an original feature image containing a target feature;
  performing an edge detection on the original feature image using an edge detection algorithm to obtain an original gradient image, obtaining a statistics ring based on the original feature image, and performing an iterative process on the statistics ring; cropping the original feature image to obtain a to-be-processed image when the statistics ring intersects with the original gradient image, and determining to-be-processed parameters of the to-be-processed image;
  acquiring a standard image corresponding to the target feature, determining a standard area corresponding to the standard image, and acquiring standard image parameters corresponding to the standard area; performing a migration process on the to-be-processed image according to the to-be-processed parameters and the standard image parameters to obtain a migration image; and
  performing a restricted contrast adaptive histogram equalization process on the migration image to obtain a target enhanced image.

A non-transitory computer-readable storage medium storing a computer program, wherein, when being executed by a processor, the computer program implements the following steps:
  acquiring an initial image, preprocessing the initial image, and acquiring an original feature image containing a target feature;
  performing an edge detection on the original feature image using an edge detection algorithm to obtain an original gradient image, obtaining a statistics ring based on the original feature image, and performing an iterative process on the statistics ring; cropping the original feature image to obtain a to-be-processed image when the statistics ring intersects with the original gradient image, and determining to-be-processed parameters of the to-be-processed image;

acquiring a standard image corresponding to the target feature, determining a standard area corresponding to the standard image, and acquiring standard image parameters corresponding to the standard area; performing a migration processing on the to-be-processed image according to the to-be-processed image parameters and the standard image parameters to obtain a migration image; and performing a restricted contrast adaptive histogram equalization process on the migration image to obtain a target enhanced image.

BRIEF DESCRIPTION OF THE DRAWINGS

The realization of objectives, functional features and advantages of the present disclosure will be further described with reference to the accompanying drawings in combination with embodiments of the present disclosure.

PREFERRED EMBODIMENTS

For clearly understanding technical features, purpose, and effect of the present disclosure, embodiments are given in detail hereinafter with reference to the accompanying drawings.

Figure 1:
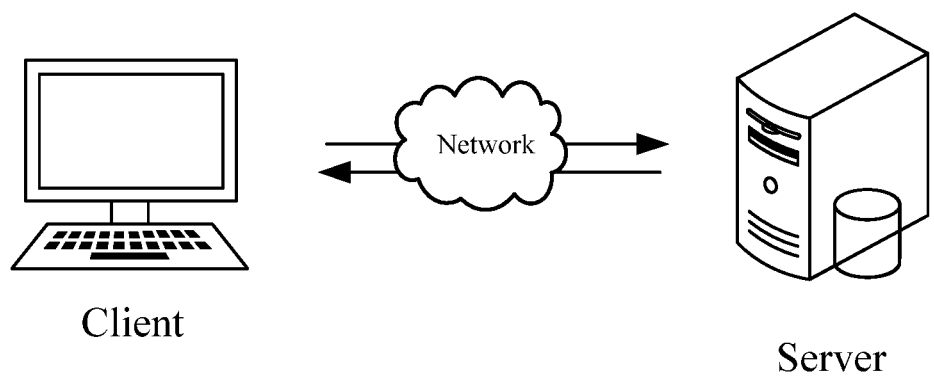
FIG. 1 is a schematic view showing an application environment of an image enhancement processing method based on artificial intelligence in accordance with an embodiment of the present disclosure.

The present disclosure provides an image enhancement processing method based on artificial intelligence, which can be applied in the application environment shown in FIG. 1. The image enhancement processing method is applied to an image enhancement processing system based on artificial intelligence. The image enhancement processing system includes a client and a server as shown in FIG. 1. The client and the server can communicate with each other through a network for accurately segment target features in the images with high qualities. The client is also called the user terminal, which refers to the program that corresponds to the server and provides local services to the client. The client can be installed on, but not limited to, various personal computers, notebook computers, smart phones, tablet computers, and portable wearable devices. The server can be an independent server or a server cluster composed of multiple servers.

Figure 2:
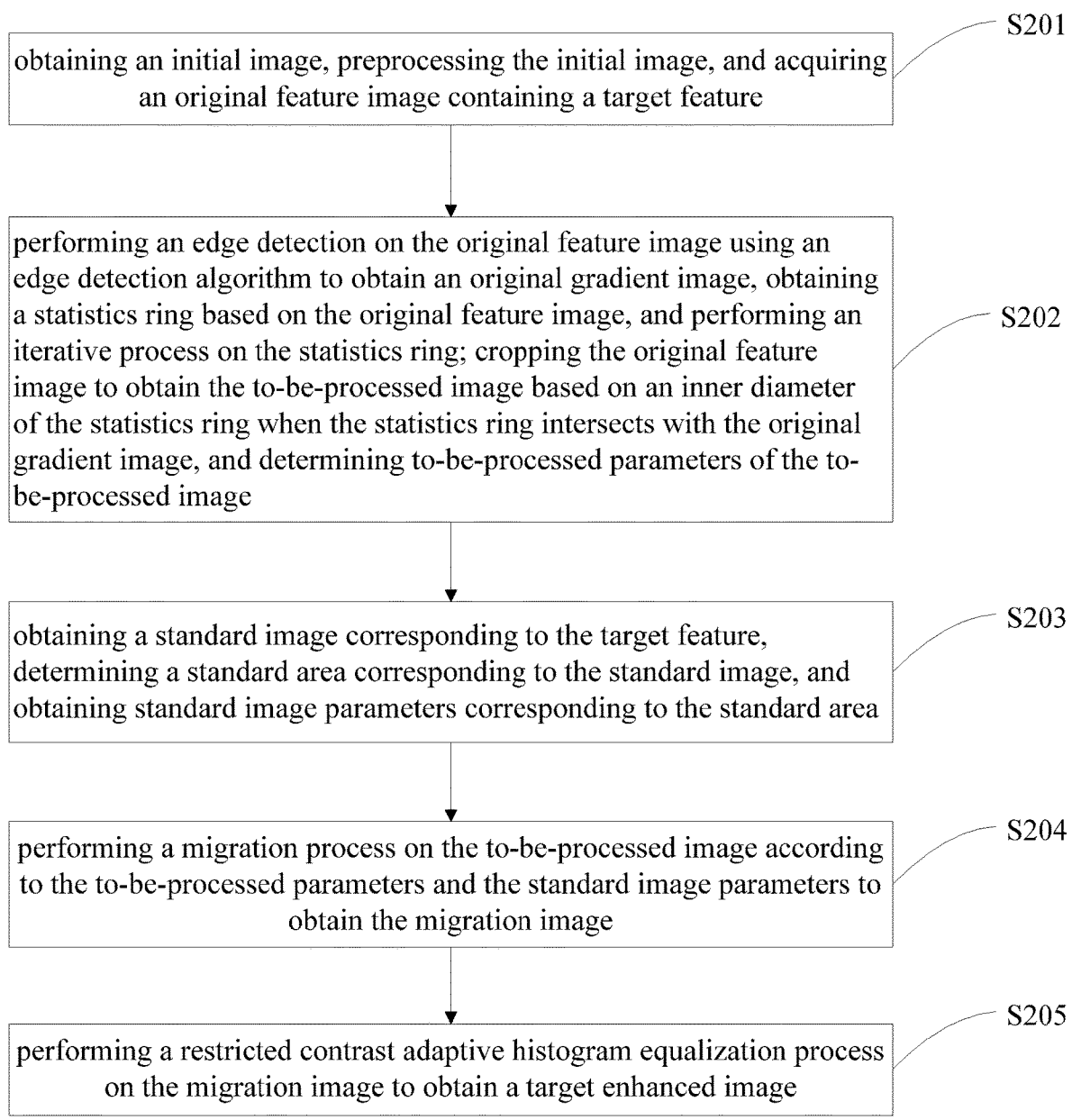
FIG. 2 is a flow chart illustrating processes of an image enhancement processing method based on artificial intelligence in accordance with an embodiment of the present disclosure.
Figure 3:
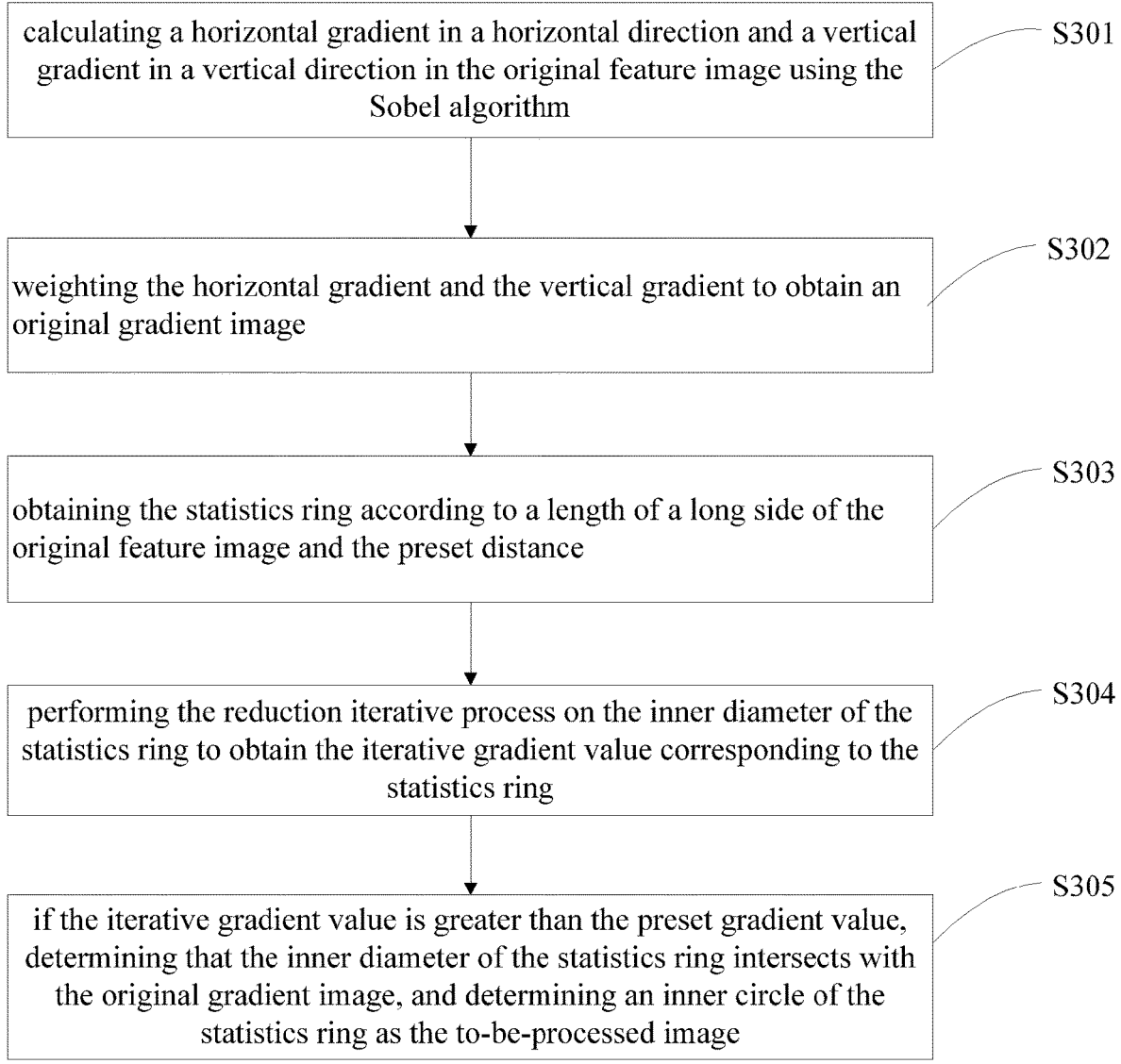
FIG. 3 is a flow chart illustrating processes of an image enhancement processing method based on artificial intelligence in accordance with another embodiment of the present disclosure.

In an embodiment, as shown in FIG. 2, an image enhancement processing method based on artificial intelligence is provided. Taking the method applied to the server in FIG. 1 as an example for description, the method includes steps as follows.

S201, obtaining an initial image, preprocessing the initial image, and acquiring an original feature image containing a target feature.

The target feature may be a human tissue such as the eyes or the mouth which needs to be identified and analyzed by computer vision technology, such that the user's symptom can be determined subsequently.

The initial image is the image of the five sense organs on the human face taken by an image capturing device. The image capturing device may be a mobile phone, a medical image capturing device, etc.

The original feature image is a rectangular image centered on the target feature obtained through cropping the initial image with the length and width of the target feature as the cropping size. It is understood that the original feature image contains non-target features, that is, the original feature image contains noise. In this embodiment, the target feature of the initial image is intercepted to facilitate the subsequent processing of the target feature, so as to reduce the processing area of a to-be-processed image and thus reduce the noise interference.

S202, performing an edge detection on the original feature image using an edge detection algorithm to obtain an original gradient image, obtaining a statistics ring based on the original feature image, and performing an iterative process on the statistics ring; cropping the original feature image to obtain the to-be-processed image based on an inner diameter of the statistics ring when the statistics ring intersects with the original gradient image, and determining to-be-processed parameters of the to-be-processed image.

The edge detection algorithm is used for detecting areas on the image with the most obvious grayscale changes. The edge detection algorithm includes but is not limited to the Sobel algorithm, the Laplace edge detection algorithm, and the Canny edge detection algorithm.

The original gradient image represents an edge of the target feature in the original feature image.

The inner diameter of the statistics ring is larger than the original gradient image, that is, the original gradient image is located in the statistics ring. An iterative gradient value refers to the gradient value of the area within the statistics ring (that is, the area corresponding to the difference between an outer diameter of the statistics ring and the inner diameter of the statistics ring). The area within the statistics ring is masked with a mask of 1, and the area outside the statistics ring is masked with a mask of 0, the original gradient image and the statistics ring are multiplied, and the mask sum of the area within the statistics ring is calculated to obtain the iterative gradient value. It should be noted that the center of the statistics ring coincides with the center of the original gradient image.

The to-be-processed image contains only the target feature. In this embodiment, the edge detection algorithm is used to process the original feature image to obtain the original gradient image, and then the precise position of the target feature is determined according to the statistics ring and the original gradient image to obtain the to-be-processed image containing only the target feature, thus, the to-be-processed image can be accurately identified and analyzed through the computer vision technology to ensure that the recognition and analysis results are more accurate.

The to-be-processed parameters of the to-be-processed image are the pixel values corresponding to the to-be-processed image, which can be the average value of the to-be-processed pixels and the variance of the to-be-processed pixels.

Since the edge in the original gradient image using the edge detection algorithm is relatively fuzzy, the edge may be continuous or discontinuous or inconsistent with the center distance of the original gradient image, if the target feature is obtained by directly segmenting the original feature image according to the original gradient image, the target feature is often inaccurate. For example, the target feature may be incomplete or there are too many non-target features. Thus, the recognition result may have errors when the target feature is recognized by the computer vision technology. In this embodiment, the edge detection algorithm is used to detect the original feature image to obtain the edge of the target feature, that is, the original gradient image. The statistics ring and the original gradient image are multiplied, a reduction iterative process is performed on the inner diameter of the statistics ring, and the mask sum of the area within the statistics ring during the reduction iterative process is calculated to form the iterative gradient value. Since the original gradient image has edge gradient values, if the inner diameter of the statistics ring does not intersect with the original gradient image, the iterative gradient value is 0; otherwise, if the inner diameter of the statistics ring intersects with the original gradient image, the iterative gradient value increases sharply. When the iterative gradient value increases sharply, it means that the statistics ring intersects with the original gradient image. At this time, a circle with the center of the original feature image as the center thereof and a half of the inner diameter of the statistics ring as a diameter thereof may be drawn on the original feature image and the original feature image is cropped to obtain the to-be-processed image only containing the target feature to accurately segment the target features, so that the to-be-processed images can be accurately identified and analyzed according to the computer vision technology to ensure a more accurate recognition and analysis results. Then, the to-be-processed parameters of the to-be-processed image are calculated, so that the to-be-processed image can be migrated to obtain an image with better image quality, thereby improving the effect of image processing.

S203, obtaining a standard image corresponding to the target feature, determining a standard area corresponding to the standard image, and obtaining standard image parameters corresponding to the standard area.

The standard image refers to an image with high brightness, contrast, and color space quality. Using the computer vision technology to recognize the standard image can obtain a better recognition effect.

The standard image parameters are the pixel parameters corresponding to the target feature in the standard image. The standard image parameters include a standard pixel average and a standard pixel variance.

In this embodiment, the standard image parameters corresponding to the standard area are acquired, so that the to-be-processed image can be migrated according to the standard image parameters to facilitate the recognition of the migration image.

S204, performing a migration process on the to-be-processed image according to the to-be-processed parameters and the standard image parameters to obtain the migration image.

The migration image refers to an image obtained by performing a migration process on the to-be-processed image, and the migration image has a higher brightness and a higher contrast.

The to-be-processed pixel at any point on the to-be-processed image is acquired, such that the migration pixel corresponding to the to-be-processed image can be calculated according to the to-be-processed pixel, the to-be-processed parameters, and the standard image parameter, and the migration image is thus formed according to the migration pixel. In this embodiment, the migration process is performed on the to-be-processed image, so that the brightness and contrast of the to-be-processed image are consistent with the brightness and contrast of the standard image, thus, the to-be-processed image is standardized.

S205, performing a restricted contrast adaptive histogram equalization process on the migration image to obtain a target enhanced image.

The restricted contrast adaptive histogram equalization is a computer image processing technology for improving the contrast of an image, which is capable of improving the contrast of a local detail of the migration image, making the image easier to be recognized, and thus improving the effect of the image enchantment processing based on artificial intelligence.

In some embodiments, the migration image is divided into a plurality of to-be-processed block images; a block histogram of each to-be-processed block image is calculated. A part of an amplitude of each block histogram being higher than a preset value is restricted to obtain a cropped histogram, and the cropped histogram is equalized to obtain the target enhanced image to ensure a better recognition effect.

In the image enhancement processing method provided in this embodiment, the initial image is acquired and is pre-processed, and the original feature image containing the target feature is acquired to facilitate the subsequent processing of the target feature, thus, the processing area of the to-be-processed image is reduced to reduce the noise interference. The edge detection algorithm is used to detect the original feature image to obtain the original gradient image, and the statistics ring is obtained based on the original feature image, and the iterative process is performed on the statistics ring. When the statistics ring intersects with the original gradient image, the original feature image is cropped to obtain the to-be-processed image according to the inner diameter of the statistics ring, thus, the target feature can be accurately segmented and the to-be-processed image can be identified and analyzed according to computer vision technology, which ensures a more accurate recognition and analysis result. The to-be-processed parameters are determined for performing the migration process on the to-be-processed image to obtain an image with a better image quality and thus to improve the effect of image processing.

The standard image corresponding to the target feature is obtained, the standard area corresponding to the standard image is determined, and the standard image parameters corresponding to the standard area are obtained, so that the to-be-processed image can be migrated according to the standard image parameters and thus the migration image can be easily to be recognized. According to the to-be-processed parameters and the standard image parameters, the to-be-processed image is migrated to obtain the migration image such that the brightness and contrast of the to-be-processed image are consistent with the brightness and contrast of the standard image, thereby standardizing the to-be-processed image. The restricted contrast adaptive histogram equalization is performed on the migration image to obtain the target enhanced image to ensure better recognition results.

In one embodiment, the step S202, that is, performing an edge detection on the original feature image using an edge detection algorithm to obtain an original gradient image, obtaining a statistics ring based on the original feature image, and performing an iterative process on the statistics ring; cropping the original feature image to obtain the to-be-processed image based on an inner diameter of the statistics ring when the statistics ring intersects with the original gradient image, and determining to-be-processed parameters of the to-be-processed image, includes steps as follows.

S301, calculating a horizontal gradient in a horizontal direction and a vertical gradient in a vertical direction in the original feature image using the Sobel algorithm.

The Sobel algorithm is a discrete difference algorithm, which combines Gaussian smoothing and differential derivation to calculate a gray scale approximation of an image brightness function. Using the Sobel algorithm at any point of the image will generate a corresponding gray vector or a normal vector.

In this embodiment, the Sobel algorithm is used to obtain the horizontal gradient and the vertical gradient of the original feature image, such that an approximate position of the edge of the target feature in the original feature image can be obtained according to the horizontal gradient and the vertical gradient.

S302, weighting the horizontal gradient and the vertical gradient to obtain an original gradient image.

In this embodiment, the horizontal gradient and the vertical gradient are weighted to obtain the original gradient image, thus, the approximate position of the edge of the target feature edge can be obtained and the precise position of the target feature can be obtained based on the original gradient image. It should be noted that the edges of the original gradient image obtained by the Sobel algorithm are relatively fuzzy, which may be continuous, or discontinuous, or inconsistent with the center distance of the original gradient image.

S303, obtaining the statistics ring according to a length of a long side of the original feature image and the preset distance.

The preset distance is used to determine the statistics ring according to the length of the long side of the original feature image (the long side refers to the longer side in the original feature image) and the preset distance. In an embodiment, the center of the original feature image is taken as the center of the statistics ring, the length of the long side of the original feature image is taken as the outer diameter of the statistics ring, and the difference between the outer diameter and the preset distance is taken as the inner diameter of the statistics ring.

In this embodiment, the statistics ring can be used to obtain the precise position of the target feature in the original feature image, thereby accurately segmenting the to-be-processed image.

S304, performing the reduction iterative process on the inner diameter of the statistics ring to obtain the iterative gradient value corresponding to the statistics ring.

In an embodiment, the reduction iterative process is performed on the inner diameter of the statistics ring. In each reduction process, the iterative gradient value of the statistics ring is acquired to determine whether the statistics ring intersects with the original gradient image, thus, the position of the target feature can be accurately segmented from the original feature image.

S305, if the iterative gradient value is greater than the preset gradient value, determining that the inner diameter of the statistics ring intersects with the original gradient image, and determining an inner circle of the statistics ring as the to-be-processed image.

In this embodiment, when the iterative gradient value is greater than the preset gradient value, the inner diameter of the statistics ring intersects with the original gradient image. The original gradient image is cropped with the center of the original gradient as a circle and the inner diameter of the statistics ring as the diameter to obtain the to-be-processed image, thus, to the position of the target feature can be accurately determined, ensuring that the subsequent image processing is targeted and the interference can be reduced.

The image enhancement processing method provided in this embodiment calculates the horizontal gradient in the horizontal direction and the vertical gradient in the vertical direction in the original feature image using the Sobel algorithm, weights the horizontal gradient and the vertical gradient, and obtains the original gradient image, and acquires the approximate position of the edge of the target feature edge in the original feature image. According to the length of the long side of the original feature image and the preset distance, the statistics ring is obtained, and the reduction iterative process is performed on the inner diameter of the statistics ring to obtain the iterative gradient value corresponding to the statistics ring, thus, whether the statistics ring intersects with the original gradient image can be determined and the target feature can be accurately segmented from the original feature image. If the iterative gradient value is greater than the preset gradient value, the inner diameter of the statistics ring intersects with the original gradient image, and the inner circle of the statistics ring is determined as the to-be-processed image, thus, the position of the target feature can be accurately determined, ensuring that the subsequent image processing is targeted and the interference is reduced.

Figure 4:
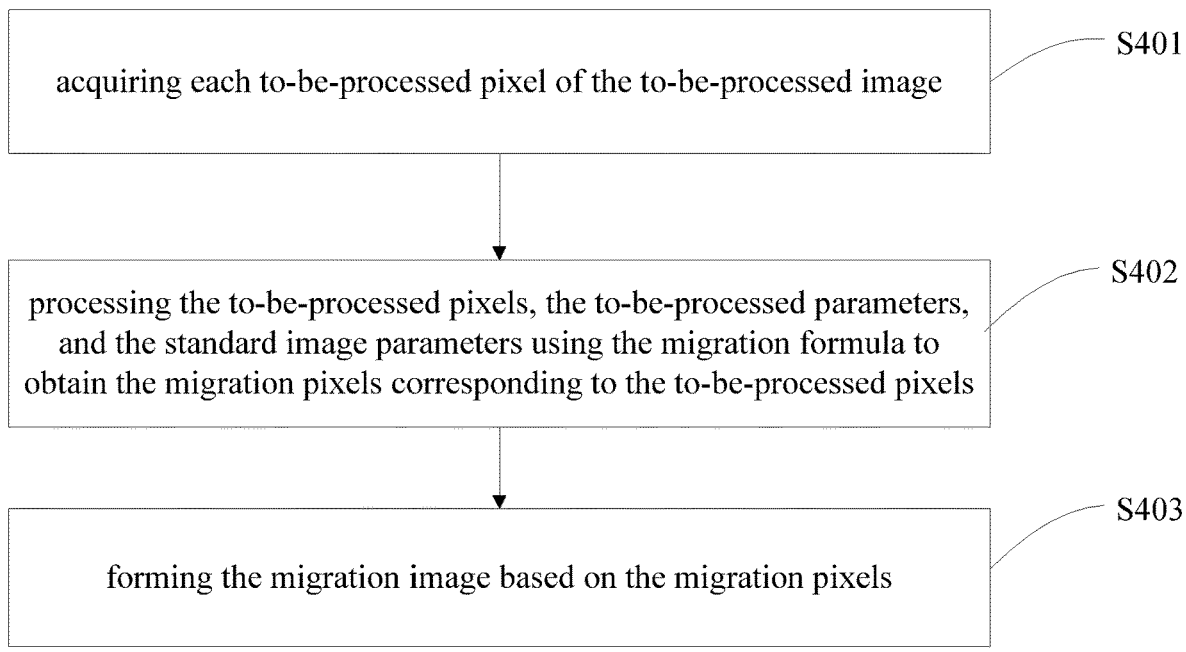
FIG. 4 is a flow chart illustrating processes of an image enhancement processing method based on artificial intelligence in accordance with another embodiment of the present disclosure.

In one embodiment, as shown in FIG. 4, the step S204, that is, performing a migration process on the to-be-processed image according to the to-be-processed parameters and the standard image parameters, and obtaining the migration image includes steps as follows.

S401, acquiring each to-be-processed pixel of the to-be-processed image.

Wherein, the to-be-processed pixels refer to pixels in the to-be-processed image.

S402, processing the to-be-processed pixels, the to-be-processed parameters, and the standard image parameters using the migration formula to obtain the migration pixels corresponding to the to-be-processed pixels.

Wherein, after the pixels are processed, one migration pixel corresponds to one to-be-processed pixel to form a migration image corresponding to the to-be-processed image.

In an embodiment, each to-be-processed pixel in the to-be-processed image is obtained, and the to-be-processed pixel, the to-be-processed parameters, and the standard image parameters are placed into the migration formula to obtain the migration pixel corresponding to the to-be-processed pixel, which provides technical support for the subsequent formation of the migration image.

S403, forming the migration image based on the migration pixels.

In this embodiment, the migration image is formed according to the migration pixels, which improves the brightness of the migration image, ensures a better color space, reduces the interference, and ensures a better the recognition effect of the subsequent image recognition using computer vision technology.

The image enhancement processing method provided in this embodiment acquires each to-be-processed pixel of the to-be-processed image. The to-be-processed pixels, the to-be-processed parameters and the standard image parameters are processed using the migration formula to obtain the migration pixels corresponding to the to-be-processed pixels, providing technical support for the subsequent formation of the migration image. The migration image is formed based on the shifted pixels, which improves the brightness of the shifted image, ensures a better color space, reduces the interference, and ensures a better recognition effect of the subsequent image recognition using computer vision technology.

In an embodiment, the to-be-processed parameters include an average value of the to-be-processed pixels and a variance of the to-be-processed pixels. The standard image parameters include a standard pixel average and a standard pixel variance.

The step S402, that is, processing the to-be-processed pixels, the to-be-processed parameters, and the standard image parameters using the migration formula to obtain the migration pixels corresponding to the to-be-processed pixels includes: placing the to-be-processed pixels, the average value of the to-be-processed pixels, the variance of the to-be-processed pixels, the standard pixel average, and the standard pixel variance into the migration formula to obtain the migration pixels corresponding to the to-be-processed pixels.

Wherein, the average value of the to-be-processed pixels refers to the average value of all the pixels in the to-be-processed image. The variance of the to-be-processed pixels refers to the variance of all pixels in the to-be-processed image. The standard pixel average refers to the average of all pixels in the standard area. The standard pixel variance refers to the variance of all pixels in the standard area. The migration formula is:

$$\text{img}_{output} = (\text{img}_{input} - \text{mean}_{input}) / (\text{std}_{input} * \text{std}_{template}) + \text{mean}_{template}$$

Wherein, $\text{img}_{output}$ is the migration pixel, $\text{img}_{input}$ is the to-be-processed pixel, $\text{mean}_{input}$ is the average value of the to-be-processed pixels, $\text{std}_{input}$ is the variance of the to-be-processed pixels; $\text{mean}_{template}$ is the standard pixel average, $\text{std}_{template}$ is the standard pixel variance.

In this embodiment, the migration formula realizes the migration process of the to-be-processed image to form the migration image, ensuring that the brightness and color space of the image to be migrated are better, and the recognition effect using the computer vision technology is better.

Figure 5:
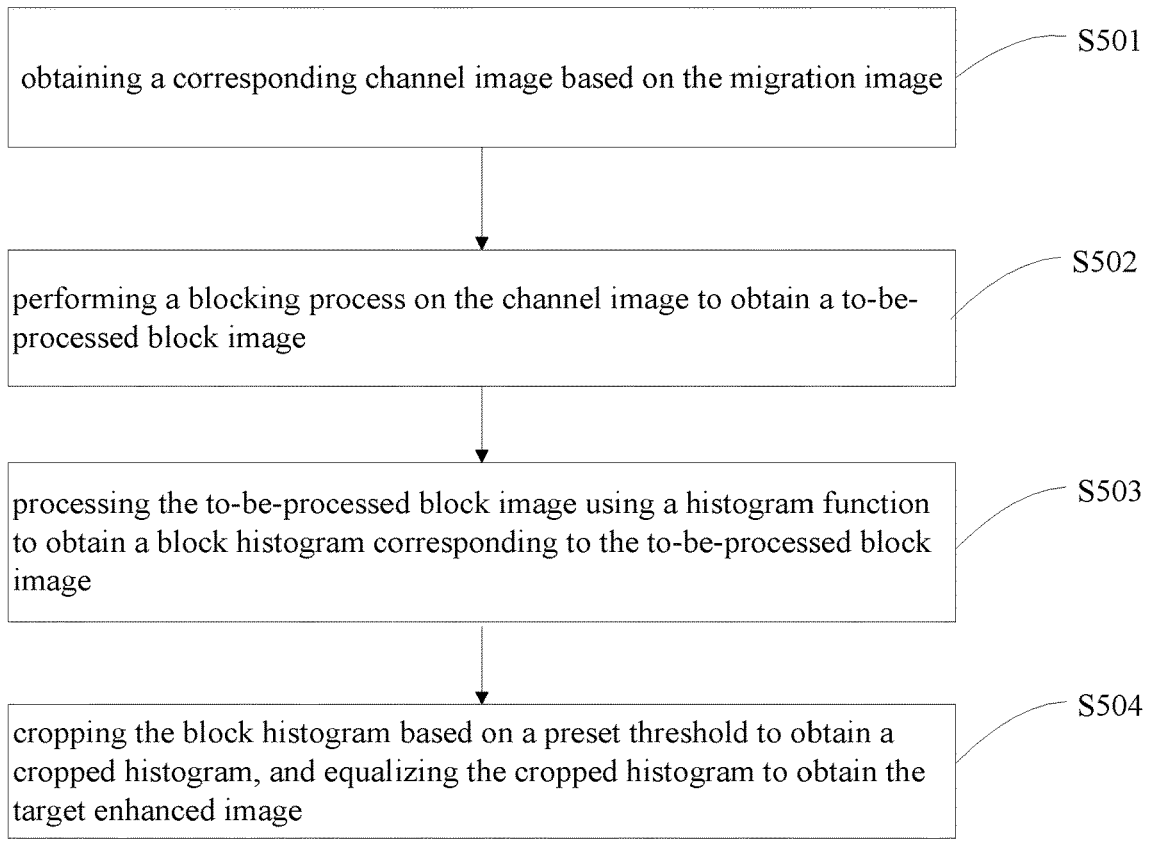
FIG. 5 is a flow chart illustrating processes of an image enhancement processing method based on artificial intelligence in accordance with another embodiment of the present disclosure.

In one embodiment, as shown in FIG. 5, step S205, that is, performing a restricted contrast adaptive histogram equalization process on the migration image to obtain a target enhanced image includes steps as follows.

S501, obtaining a corresponding channel image based on the migration image.

Among them, the channel image refers to the image corresponding to a L channel. The channel image contains brightness information such that the migration image can be processed according to the brightness information, which improves local detail contrast information of the migration image and ensures that the target enhanced image has a higher definition, thus, the image enhancement processing effect is better and the subsequent recognition effect using the computer vision technology is better.

In an embodiment, the migration image is converted into the Lab channel, and only the L channel is processed, such that the migration image can be processed according to the brightness information, which improves the local detail contrast information of the migration image, and avoids serious color cast caused by processing the migration image by separately using RGB three channels.

S502, performing a blocking process on the channel image to obtain a to-be-processed block image.

In an embodiment, the channel image is uniformly divided into 8*8 blocks to obtain 64 to-be-processed block images, so that each to-be-processed block image is processed separately to improve the local detail contrast information of the to-be-processed block image and avoid the problem that the entire gray dynamic range is not fully utilized and the local contrast cannot be effectively improved.

S503, processing the to-be-processed block image using a histogram function to obtain a block histogram corresponding to the to-be-processed block image.

Wherein, the histogram function converts the to-be-processed block image into a block histogram.

In this embodiment, the block histogram can be quickly obtained by the histogram function, such that gray scale transformation can be performed according to the pixel distribution of the block histogram and thus improves the contrast of the image.

S504, cropping the block histogram based on a preset threshold to obtain a cropped histogram, and equalizing the cropped histogram to obtain the target enhanced image.

Wherein, the preset threshold is used for cropping the block histogram.

In an embodiment, a mapping function is obtained by cropping the block histogram, and a value of each pixel in the to-be-processed block image is obtained by bilinear interpolation of the mapping function values of the four surrounding block histograms, thus, the pixel of the to-be-processed block histogram is transformed according to the mapping function value, which improves the local detail contrast information and obtains the target enhanced image.

Figure 6:
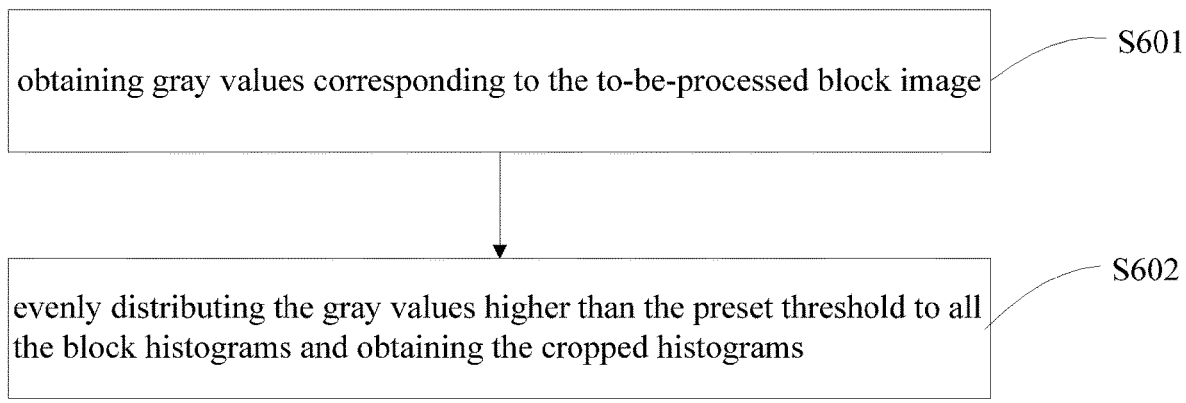
FIG. 6 is a flow chart illustrating processes of an image enhancement processing method based on artificial intelligence in accordance with another embodiment of the present disclosure.

In one embodiment, as shown in FIG. 6, step S504, that is, cropping the block histogram based on a preset threshold to obtain the cropped histogram, equalizing the cropped histogram to obtain the target enhanced image includes steps as follows.

S601, obtaining gray values corresponding to the to-be-processed block image.

S602, evenly distributing the gray values higher than the preset threshold to all the block histograms and obtaining the cropped histograms.

In an embodiment, since some gray values are too high, if a mapping curve is directly obtained from the block histogram, a slope of the mapping curve is too high, and all gray values are mapped to the right side of the entire gray axis, resulting in image distortion. Thus, by evenly distributing the gray values higher than the preset threshold to all the block histograms, the local contrast can be restricted and thus the local detail contrast information of the target enhanced image obtained by subsequent equalization is clear.

Figure 7:
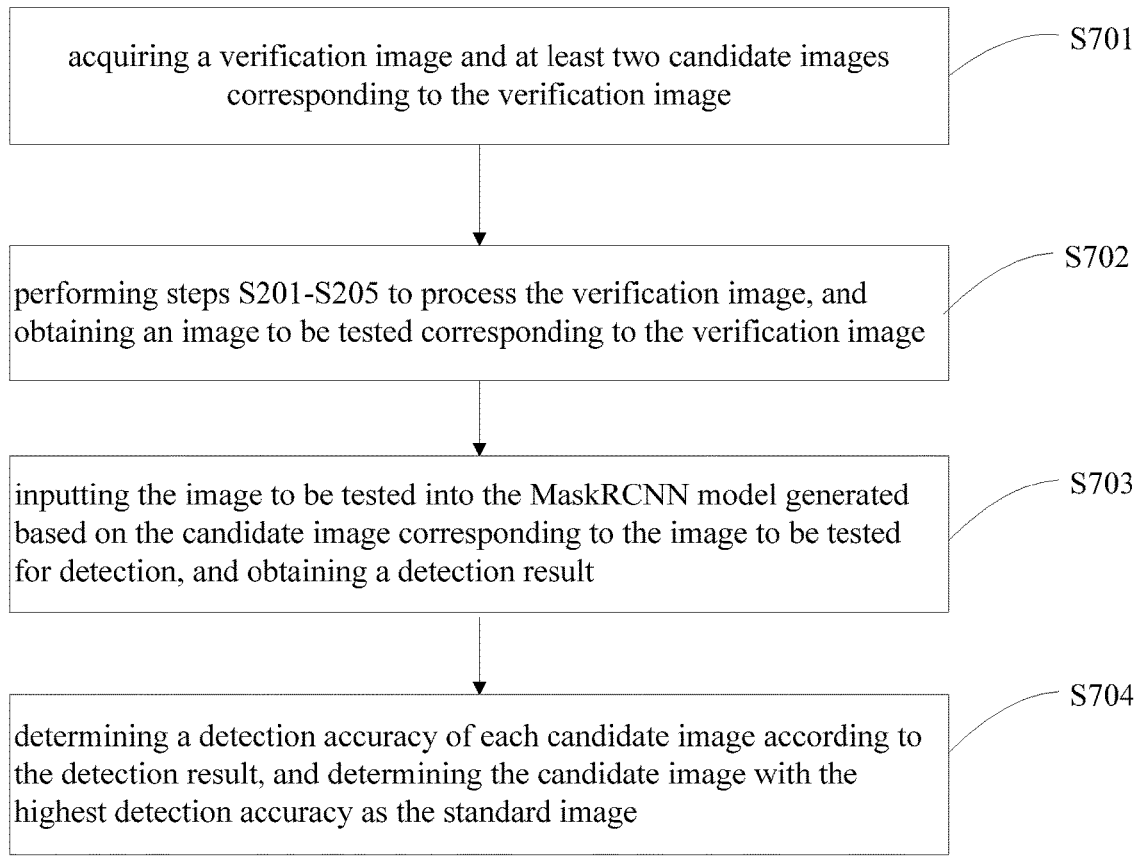
FIG. 7 is a flow chart illustrating processes of an image enhancement processing method based on artificial intelligence in accordance with another embodiment of the present disclosure.

In an embodiment, as shown in FIG. 7, before step S201, that is, obtaining an initial image, preprocessing on the initial image, and acquiring an original feature image containing a target feature, the method further includes steps as follows.

S701, acquiring a verification image and at least two candidate images corresponding to the verification image.

Wherein, the candidate images refer to pre-collected high-quality template images, and the candidate images are selected to determine the image with the best quality as the standard image.

The verification image is used to verify the quality of the image to be tested.

S702, performing steps S201-S205 to process the verification image, and obtaining an image to be tested corresponding to the verification image.

The image to be tested is an image obtained after the verification image is enhanced according to the candidate image, and is used to verify the quality of the candidate image.

For example, the verification images are a1, a2, and a3, the candidate images are b1, b2, b3, and b4; the verification images a1, a2, and a3 are migrated according to the candidate image b1, the verification images a1, a2, and a3 are migrated according to the candidate image b2, the verification images a1, a2, and a3 are migrated based on the candidate image b3, and the verification images a1, a2, and a3 are migrated based on the candidate image b4 to obtain the migration image. The restricted contrast adaptive histogram equalization process is performed on the migration image to obtain the images c11, c21, and c31 to be tested corresponding to the candidate image b1, the images c12, c22, and c32 to be tested corresponding to the candidate image b2, the images c13, c23, and c33 to be tested corresponding to the candidate image b3, and the images c14, c24, and c34 to be tested corresponding to the candidate image b4.

S703, inputting the image to be tested into the MaskRCNN model generated based on the candidate image corresponding to the image to be tested for detection, and obtaining a detection result.

Wherein, the detection result is obtained by scanning the candidate image by the MaskRCNN model and generating the bounding box and mask of the target feature in the candidate image. The detection result is used for selecting the candidate image. The detection result indicates the proportion of the part of the candidate image to be the target feature that is selected by the MaskRCNN model. For example, the detection result can be 100%, that is, the MaskRCNN model can accurately detect the target feature in the candidate image, that is, the detection result is accurate; or the detection result can be 50%, that is, 50% of the target feature in the candidate image can be detected by the MaskRCNN model, that is, the detection result is wrong.

For example, the detection result of each image to be tested is obtained by inputting c11, c21, and c31 into MaskRCNN model 1, c11, c21, and c31 into MaskRCNN model 2, c11, c21, and c31 into MaskRCNN model 3, and c11, c21, and c31 into MaskRCNN model 4.

S704, determining a detection accuracy of each candidate image according to the detection result, and determining the candidate image with the highest detection accuracy as the standard image.

Wherein, the detection accuracy is used to indicate whether the detection result is accurate, that is, the detection accuracy is obtained by dividing the number of accurate detection results by the total number of detection results.

In an embodiment, the statistics of the detection accuracy corresponding to the image to be tested which is processed according to each candidate image is obtained, and the candidate image with the highest detection accuracy is selected and determined as the standard image for providing a reference image with the best quality for the to-be-processed image.

In this embodiment, the verification image and at least two candidate images corresponding to the verification image are acquired; steps S201-S205 are executed to process the verification image, and the image to be tested corresponding to the verification image is acquired to verify the quality of the candidate image. The detection result is obtained by inputting the image to be tested into the MaskRCNN model generated based on the candidate image corresponding to the image to be tested for detection, thus, the candidate image can be selected. According to the detection results, the detection accuracy of each candidate image is determined, and the candidate image with the highest detection accuracy is determined as the standard image, so that the reference image with the best quality can be provided for the to-be-processed image.

It should be understood that the sequence number of each step in the foregoing embodiment does not mean the sequence of execution. The execution sequence of each process should be determined by its function and internal logic, and should not constitute any limitation on the implementation process of the embodiment of the present disclosure.

Figure 8:
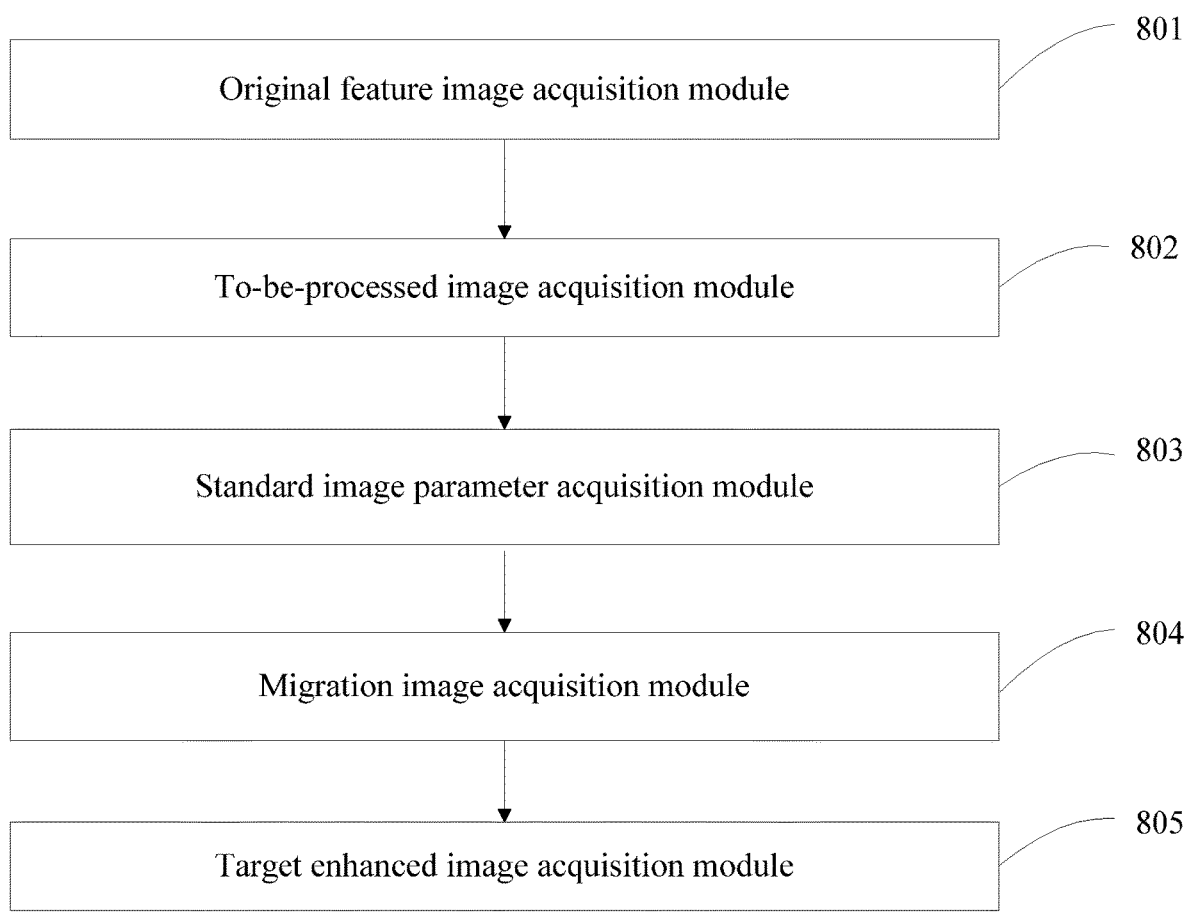
FIG. 8 is a schematic view of an image enhancement processing device based on artificial intelligence in accordance with an embodiment of the present disclosure.

In one embodiment, an image enhancement processing device based on artificial intelligence is provided, and the image enhancement processing device respectively corresponds to the image enhancement processing method in the above-mentioned embodiment. As shown in FIG. 8, the image enhancement processing device includes an original feature image acquisition module 801, a to-be-processed image acquisition module 802, a standard image parameter acquisition module 803, a migration image acquisition module 804, and a target enhanced image acquisition module 805. The detailed description of each functional module is given as follows.

The original feature image acquisition module 801 is configured for acquiring an initial image, preprocessing the initial image, and acquiring an original feature image containing the target feature.

The to-be-processed image acquisition module 802 is configured for performing edge detection on the original feature image using an edge detection algorithm and obtaining the original gradient image, obtaining a statistics ring based on the original feature image, and performing an iterative process on the statistics ring; cropping the original feature image to obtain the to-be-processed image when the statistics ring intersects with the original gradient image according to an inner diameter of the statistics ring, and determining to-be-processed parameters of the to-be-processed image.

The standard image parameter acquisition module 803 is configured for acquiring a standard image corresponding to the target feature, determining a standard area corresponding to the standard image, and obtaining a standard image parameter corresponding to the standard area.

The migration image acquisition module 804 is configured for performing migration process on the to-be-processed image according to the to-be-processed parameters and the standard image parameters to acquire the migration image, performing a migration process on the to-be-processed image to obtain a migration image.

The target enhanced image acquisition module 805 is configured for performing a restricted contrast adaptive histogram equalization process on the migration image to acquire a target enhanced image.

In an embodiment, the to-be-processed image acquisition module 802 includes a gradient calculation unit, an original gradient image acquisition unit, a statistics ring acquisition unit, an iterative gradient value acquisition unit, and a to-be-processed image acquisition unit.

The gradient calculation unit is configured for calculating a horizontal gradient in the horizontal direction and a vertical gradient in the vertical direction in the original feature image using the Sobel algorithm.

The original gradient image acquisition unit is configured for weighting the horizontal gradient and the vertical gradient to acquire the original gradient image.

The statistics ring obtaining unit is configured for obtaining the statistics ring according to a length of a long side of the original feature image and a preset distance.

The iterative gradient value acquisition unit is configured for performing a reduction iterative process on an inner diameter of the statistics ring to obtain an iterative gradient value corresponding to the statistics ring.

The to-be-processed image acquisition unit is configured for, if the iterative gradient value is greater than the preset gradient value, determining that the inner diameter of the statistics ring intersects with the original gradient image, and determining an inner circle of the statistics ring as the to-be-processed image.

In an embodiment, the migration image acquisition module 804 includes a to-be-processed pixel acquisition unit, a migration pixel acquisition unit, and a migration image acquisition unit.

The to-be-processed pixel acquiring unit is configured for acquiring each to-be-processed pixel of the to-be-processed image.

The migration pixel acquisition unit is configured for processing the to-be-processed pixels, the to-be-processed parameters, and the standard image parameters by using the migration formula to acquire the migration pixels corresponding to the to-be-processed pixels.

The migration image acquisition unit is configured for forming a migration image based on the migration pixels.

In an embodiment, the to-be-processed parameters include an average value of the to-be-processed pixels and a variance of the to-be-processed pixels. The standard image parameters include a standard pixel average and a standard pixel variance.

The migration pixel acquisition unit includes a migration pixel calculation unit.

The to-be-processed pixel, the average value of the to-be-processed pixels, the variance of the to-be-processed pixels, the standard pixel average, and the standard pixel variance are placed into the migration formula to obtain the migration pixel corresponding to the to-be-processed image.

In an embodiment, the target enhanced image acquisition module 805 includes a channel image acquisition unit, a to-be-processed block image acquisition unit, a block histogram acquisition unit, and an equalization processing unit.

The channel image acquisition unit is configured for acquiring the corresponding channel image based on the migration image.

The to-be-processed block image acquisition unit is configured for performing a blocking process on the channel image to obtain the to-be-processed block image.

The block histogram obtaining unit is configured for processing the to-be-processed block image by using a histogram function, and obtaining a block histogram corresponding to the to-be-processed block image.

The equalization processing unit is configured for cropping the block histogram based on a preset threshold to obtain a cropped histogram, equalizing the cropped histogram to obtain the target enhanced image.

In an embodiment, the equalization processing unit includes a gray value obtaining unit and the cropped histogram obtaining unit.

The gray value obtaining unit is configured for obtaining gray values corresponding to the to-be-processed block image.

The cropped histogram obtaining unit is configured for evenly distributing the gray values higher than the preset threshold to all the block histograms to obtain the cropped histogram.

In an embodiment, the image enhancement processing device further includes a candidate image acquisition module, a test image acquisition module, a detection result acquisition module, and a standard image acquisition module.

The candidate image acquisition module is configured for acquiring a verification image and at least two candidate images corresponding to the verification image.

The test image acquisition module is configured for performing the steps of claim 1 to process the verification image to obtain the test image corresponding to the verification image.

The detection result acquisition module is configured for inputting the image to be tested into the MaskRCNN model generated based on the candidate image corresponding to the image to be tested for detection, and obtaining the detection result.

The standard image acquisition module is configured for determining a detection accuracy of each candidate image according to the detection result, and determining the candidate image with the highest detection accuracy as the standard image.

Regarding the specific definition of the image enhancement processing device, please refer to the above definition of the image enhancement processing method, which will not be repeated here. Each module in the above image enhancement processing device can be implemented in whole or in part by software, hardware, and a combination thereof. The above-mentioned modules may be embedded in the processor in the form of hardware or independent of the processor in the computer equipment, or may be stored in the memory of the computer equipment in the form of software, so that the processor can call and execute the operations corresponding to the above-mentioned modules.

Figure 9:
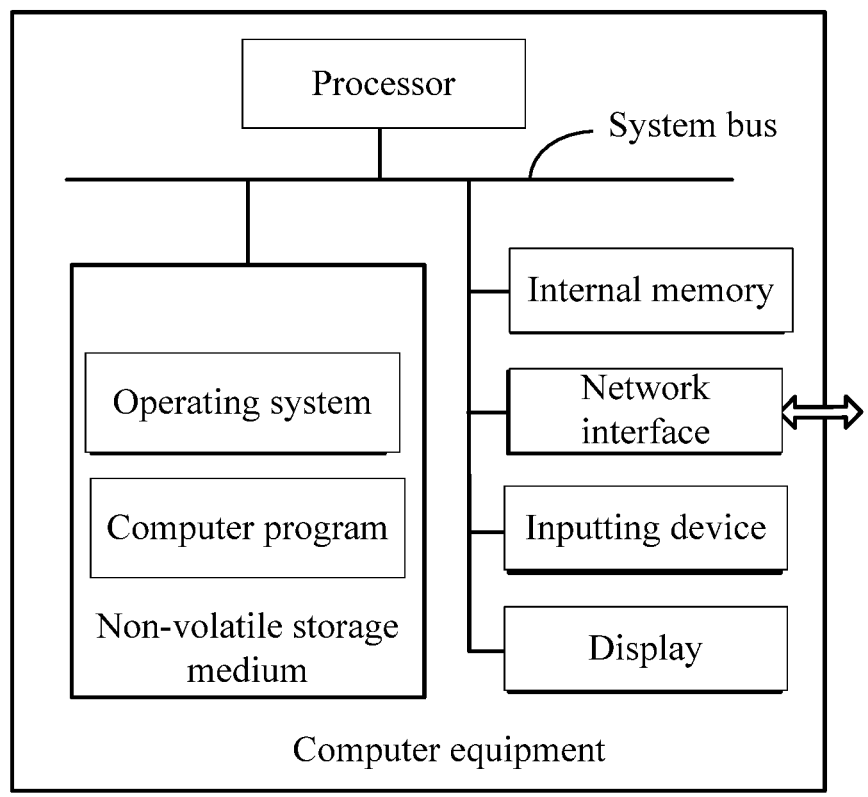
FIG. 9 is a schematic view of a computer equipment in accordance with an embodiment of the resent disclosure.

In one embodiment, a computer equipment is provided. The computer equipment may be a server, and its internal structure diagram may be as shown in FIG. 9. The computer equipment includes a processor, a memory, a network interface, and a database connected through a system bus. The processor is configured for providing calculation and control capabilities. The memory includes a non-volatile or volatile storage medium and internal memory. The non-volatile or volatile storage medium stores an operating system, a computer program, and a database. The internal memory provides an environment for the operation of operating systems and computer programs in non-volatile or volatile storage media. The database is configured for storing the target enhanced image. The network interface is configured for communicating with an external terminal through a network connection. The computer program is executed by the processor to realize an image enhancement processing method based on artificial intelligence.

In one embodiment, a computer equipment is provided, including a memory, a processor, and a computer program stored in the memory and capable of running on the processor. When the processor executes the computer program, the image enhancement processing method in the above-mentioned embodiment is implemented. The steps of the image enhancement processing method, such as steps S201-S205 shown in FIG. 2, or the steps shown from FIG. 3 to FIG. 7, are not repeated here. Or, when the processor executes the computer program, the function of each module/unit in the embodiment of the image enhancement processing device, such as the original feature image acquisition module 801, the to-be-processed image acquisition module 802, and the standard image parameter acquisition module 803, the migration image acquisition module 804, and the target enhanced image acquisition module 80 as shown in FIG. 8 is implemented, which is not repeated here.

In one embodiment, a non-transitory computer-readable storage medium is provided. The non-transitory computer-readable storage medium may be non-volatile. The non-transitory computer-readable storage medium stores a computer program; when the computer program is executed by a processor, the steps of the image enhancement processing method based on artificial intelligence in the above embodiment are implemented, such as steps S201-S205 shown in FIG. 2, or the steps shown from FIG. 3 to FIG. 7, which is not repeated. Or, when the processor executes the computer program, the function of each module/unit in the embodiment of the image enhancement processing device based on artificial intelligence, such as the original feature image acquisition module 801, the to-be-processed image acquisition module 802, and the standard image parameter acquisition module 803, the migration image acquisition module 804, and the target enhanced image acquisition module 80 as shown in FIG. 8 is implemented, which is not repeated here.

A person of ordinary skill in the art can understand that all or part of the processes in the method of the foregoing embodiments can be implemented by instructing relevant hardware through a computer program. The computer program can be stored in a non-volatile computer readable storage. When the computer program is executed, the process of the method of the above embodiments can be implemented. Wherein, any reference to memory, storage, database or other media used in the embodiments provided in this application may include non-volatile and/or volatile memory. Non-volatile memory may include read only memory (ROM), programmable ROM (PROM), electrically programmable ROM (EPROM), electrically erasable programmable ROM (EEPROM), or flash memory. Volatile memory may include random access memory (RAM) or external cache memory. As an illustration and not a limitation, RAM is available in many forms, such as static RAM (SRAM), dynamic RAM (DRAM), synchronous DRAM (SDRAM), double data rate SDRAM (DDRSDRAM), enhanced SDRAM (ESDRAM), synchronous chain Channel (Synchlink) DRAM (SLDRAM), memory bus (Rambus) direct RAM (RDRAM), direct memory bus dynamic RAM (DRDRAM), and memory bus dynamic RAM (RDRAM), etc.

Those skilled in the art can clearly understand that, for the convenience and conciseness of description, the division of the above functional units and modules are only used as an example. In practical applications, the above functions can be implemented by different functional units and modules as needed. That is, the internal structure of the device is divided into different functional units or modules to complete all or part of the functions described above.

The contents described above are only preferred embodiments of the present disclosure, but the scope of the present disclosure is not limited to the embodiments. Any ordinarily skilled in the art would make any modifications or replacements to the embodiments in the scope of the present disclosure, and these modifications or replacements should be included in the scope of the present disclosure. Thus, the scope of the present disclosure should be subjected to the claims.

What is claimed is:

1. An image enhancement processing method based on artificial intelligence, comprising:
    acquiring an initial image, preprocessing the initial image, and acquiring an original feature image containing a target feature;
    performing an edge detection on the original feature image using an edge detection algorithm to obtain an original gradient image, obtaining a statistics ring based on the original feature image, and performing an iterative process on the statistics ring; when the statistics ring intersects with the original gradient image, cropping the original feature image to obtain a to-be-processed image based on an inner diameter of on the statistics ring, and determining to-be-processed parameters of the to-be-processed image:
    acquiring a standard image corresponding to the target feature, determining a standard area corresponding to the standard image, and acquiring standard image parameters corresponding to the standard area; performing a migration process on the to-be-processed image according to the to-be-processed parameters and the standard image parameters to obtain a migration image; and
    performing a restricted contrast adaptive histogram equalization process on the migration image to obtain a target enhanced image.

2. The image enhancement processing method of claim 1, wherein performing an edge detection on the original feature image using an edge detection algorithm to obtain an original gradient image, obtaining a statistics ring based on the original feature image, and performing an iterative process on the statistics ring; when the statistics ring intersects with the original gradient image, cropping the original feature image to obtain a to-be-processed image based on an inner diameter of on the statistics ring, and determining to-be-processed parameters of the to-be-processed image comprises:
    calculating a horizontal gradient in a horizontal direction and a vertical gradient in a vertical direction in the original feature image by using Sobel algorithm;
    weighting the horizontal gradient and the vertical gradient to obtain an original gradient image;

obtaining the statistics ring according to a length of a long side of the original feature image and a preset distance;

performing a reduction iterative process on an inner diameter of the statistics ring to obtain an iterative gradient value corresponding to the statistics ring;

if the iterative gradient value is greater than a preset gradient value, determining that the inner diameter of the statistics ring intersects with the original gradient image, and determining the inner circle of the statistics ring as the to-be-processed image.

3. The image enhancement processing method of claim 1, wherein performing a migration process on the to-be-processed image according to the to-be-processed parameters and the standard image parameters to obtain a migration image comprises:

acquiring each to-be-processed pixel of the to-be-processed image;

processing the to-be-processed pixel, the to-be-processed parameters, and the standard image parameters by using a migration formula to obtain a migration pixel corresponding to the to-be-processed pixel; and forming the migration image based on the migration pixels.

4. The image enhancement processing method of claim 3, wherein the to-be-processed parameters comprise an average value of the to-be-processed pixels and a variance of the to-be-processed pixels; the standard image parameters comprise a standard pixel average and a standard pixel variance;

the processing the to-be-processed pixel, the to-be-processed parameters, and the standard image parameters by using a migration formula to obtain a migration pixel corresponding to the to-be-processed pixel comprises:

placing the to-be-processed pixels, the average value of the to-be-processed pixels, the variance of the to-be-processed pixels, the standard pixel average, and the standard pixel variance into the migration formula, and obtaining the migration pixel corresponding to the to-be-processed pixels.

5. The image enhancement processing method of claim 1, wherein the performing a restricted contrast adaptive histogram equalization process on the migration image to obtain a target enhanced image comprises:

acquiring a corresponding channel image based on the migration image;

performing a blocking process on the channel image to obtain a to-be-processed block image;

processing the to-be-processed block image using a histogram function, and obtaining a block histogram corresponding to the to-be-processed block image;

cropping the block histogram based on a preset threshold to obtain the cropped histogram, equalizing the cropped histogram to obtain the target enhanced image.

6. The image enhancement processing method of claim 5, wherein cropping the block histogram based on a preset threshold to obtain the cropped histogram comprises:

acquiring a gray value corresponding to the to-be-processed block image;

evenly distributing the gray values higher than the preset threshold to all the block histograms and obtaining the cropped histogram.

7. The image enhancement processing method of claim 1, wherein before the acquiring an original feature image containing a target feature; the image enhancement processing method further comprises:

acquiring a verification image and at least two candidate images corresponding to the verification image; performing the steps of claim 1 to process the verification image, and obtaining an image to be tested corresponding to the verification image;

inputting the image to be tested into a MaskRCNN model generated based on the candidate image corresponding to the image to be tested for detection, and obtaining a detection result;

according to the detection result, determining a detection accuracy of each candidate image, and determining the candidate image with the highest detection accuracy as a standard image.

8. A computer equipment comprising a memory, a processor, and a computer program stored in the memory and running on the processor, wherein, when being executed by the processor, the computer program implements following steps:

acquiring an initial image, preprocessing the initial image, and acquiring an original feature image containing a target feature;

performing an edge detection on the original feature image using an edge detection algorithm to obtain an original gradient image, obtaining a statistics ring based on the original feature image, and performing an iterative process on the statistics ring; cropping the original feature image to obtain a to-be-processed image when the statistics ring intersects with the original gradient image, and determining to-be-processed parameters of the to-be-processed image;

acquiring a standard image corresponding to the target feature, determining a standard area corresponding to the standard image, and acquiring standard image parameters corresponding to the standard area; performing a migration process on the to-be-processed image according to the to-be-processed parameters and the standard image parameters to obtain a migration image; and performing a restricted contrast adaptive histogram equalization process on the migration image to obtain a target enhanced image.

9. The computer equipment of claim 8, wherein the performing an edge detection on the original feature image using an edge detection algorithm to obtain an original gradient image, obtaining a statistics ring based on the original feature image, and performing an iterative process on the statistics ring; when the statistics ring intersects with the original gradient image, cropping the original feature image to obtain a to-be-processed image based on an inner diameter of on the statistics ring, and determining to-be-processed parameters of the to-be-processed image comprises:

calculating a horizontal gradient in a horizontal direction and a vertical gradient in a vertical direction in the original feature image by using Sobel algorithm;

weighting the horizontal gradient and the vertical gradient to obtain an original gradient image;

obtaining the statistics ring according to a length of a long side of the original feature image and a preset distance;

performing a reduction iterative process on an inner diameter of the statistics ring to obtain an iterative gradient value corresponding to the statistics ring;

if the iterative gradient value is greater than a preset gradient value, determining that the inner diameter of the statistics ring intersects with the original gradient image, and determining the inner circle of the statistics ring as the to-be-processed image.

10. The computer equipment of claim 8, wherein the performing a migration process on the to-be-processed image according to the to-be-processed parameters and the standard image parameters to obtain a migration image comprises:
acquiring each to-be-processed pixel of the to-be-processed image;
processing the to-be-processed pixel, the to-be-processed parameters, and the standard image parameters by using a migration formula to obtain a migration pixel corresponding to the to-be-processed pixel; and
forming the migration image based on the migration pixels.

11. The computer equipment of claim 10, wherein the to-be-processed parameters comprise an average value of the to-be-processed pixels and a variance of the to-be-processed pixels; the standard image parameters comprise a standard pixel average and a standard pixel variance;
the processing the to-be-processed pixel, the to-be-processed parameters, and the standard image parameters by using a migration formula to obtain a migration pixel corresponding to the to-be-processed pixel comprises:
placing the to-be-processed pixels, the average value of the to-be-processed pixels, the variance of the to-be-processed pixels, the standard pixel average, and the standard pixel variance into the migration formula, and obtaining the migration pixel corresponding to the to-be-processed pixels.

12. The computer equipment of claim 8, wherein the performing a restricted contrast adaptive histogram equalization process on the migration image to obtain a target enhanced image comprises:
acquiring a corresponding channel image based on the migration image;
performing a blocking process on the channel image to obtain a to-be-processed block image;
processing the to-be-processed block image using a histogram function, and obtaining a block histogram corresponding to the to-be-processed block image;
cropping the block histogram based on a preset threshold to obtain the cropped histogram, equalizing the cropped histogram to obtain the target enhanced image.

13. The computer equipment of claim 12, wherein cropping the block histogram based on a preset threshold to obtain the cropped histogram comprises:
acquiring a gray value corresponding to the to-be-processed block image;
evenly distributing the gray values higher than the preset threshold to all the block histograms and obtaining the cropped histogram.

14. The computer equipment of claim 8, wherein before the acquiring an original feature image containing a target feature; the computer program further implements the following steps when being executed by the processor:
acquiring a verification image and at least two candidate images corresponding to the verification image; performing the steps of a predetermined image enhancement processing method to process the verification image, and obtaining an image to be tested corresponding to the verification image;
inputting the image to be tested into a MaskRCNN model generated based on the candidate image corresponding to the image to be tested for detection, and obtaining a detection result;
according to the detection result, determining a detection accuracy of each candidate image, and determining the candidate image with the highest detection accuracy as a standard image.

15. A non-transitory computer-readable storage medium storing a computer program, wherein, when being executed by a processor, the computer program implements the following steps:
acquiring an initial image, preprocessing the initial image, and acquiring an original feature image containing a target feature;
performing an edge detection on the original feature image using an edge detection algorithm to obtain an original gradient image, obtaining a statistics ring based on the original feature image, and performing an iterative process on the statistics ring; cropping the original feature image to obtain a to-be-processed image when the statistics ring intersects with the original gradient image, and determining to-be-processed parameters of the to-be-processed image;
acquiring a standard image corresponding to the target feature, determining a standard area corresponding to the standard image, and acquiring standard image parameters corresponding to the standard area; performing a migration processing on the to-be-processed image according to the to-be-processed image parameters and the standard image parameters to obtain a migration image; and
performing a restricted contrast adaptive histogram equalization process on the migration image to obtain a target enhanced image.

16. The non-transitory computer-readable storage medium of claim 15, wherein the performing an edge detection on the original feature image using an edge detection algorithm to obtain an original gradient image, obtaining a statistics ring based on the original feature image, and performing an iterative process on the statistics ring; when the statistics ring intersects with the original gradient image, cropping the original feature image based on an inner diameter of on the statistics ring to obtain a to-be-processed image, and determining to-be-processed parameters of the to-be-processed image comprises:
calculating a horizontal gradient in a horizontal direction and a vertical gradient in a vertical direction in the original feature image by using Sobel algorithm;
weighting the horizontal gradient and the vertical gradient to obtain an original gradient image;
obtaining the statistics ring according to a length of a long side of the original feature image and a preset distance;
performing a reduction iterative process on an inner diameter of the statistics ring to obtain an iterative gradient value corresponding to the statistics ring;
if the iterative gradient value is greater than a preset gradient value, determining that the inner diameter of the statistics ring intersects with the original gradient image, and determining the inner circle of the statistics ring as the to-be-processed image.

17. The non-transitory computer-readable storage medium of claim 15, wherein the performing a migration process on the to-be-processed image according to the to-be-processed parameters and the standard image parameters to obtain a migration image comprises:
acquiring each to-be-processed pixel of the to-be-processed image;
processing the to-be-processed pixel, the to-be-processed parameters, and the standard image parameters by using a migration formula to obtain a migration pixel corresponding to the to-be-processed pixel; and
forming the migration image based on the migration pixels.

18. The non-transitory computer-readable storage medium of claim 17, wherein the to-be-processed parameters comprise an average value of the to-be-processed pixels and a variance of the to-be-processed pixels; the standard image parameters comprise a standard pixel average and a standard pixel variance;

the processing the to-be-processed pixel, the to-be-processed parameters, and the standard image parameters by using a migration formula to obtain a migration pixel corresponding to the to-be-processed pixel comprises:

placing the to-be-processed pixels, the average value of the to-be-processed pixels, the variance of the to-be-processed pixels, the standard pixel average, and the standard pixel variance into the migration formula, and obtaining the migration pixel corresponding to the to-be-processed pixels.

19. The non-transitory computer-readable storage medium of claim 15, wherein the performing a restricted contrast adaptive histogram equalization process on the migration image to obtain a target enhanced image comprises:

acquiring a corresponding channel image based on the migration image;

performing a blocking process on the channel image to obtain a to-be-processed block image;

processing the to-be-processed block image using a histogram function, and obtaining a block histogram corresponding to the to-be-processed block image;

cropping the block histogram based on a preset threshold to obtain the cropped histogram, equalizing the cropped histogram to obtain the target enhanced image.

* * * * *